United States Patent
Han et al.

(10) Patent No.: US 8,472,138 B2
(45) Date of Patent: Jun. 25, 2013

(54) SELF-ALIGNED FULL SIDE SHIELD PMR AND METHOD TO MAKE IT

(75) Inventors: Cherng-Chyi Han, San Jose, CA (US); Min Li, Dublin, CA (US); Fenglin Liu, Milpitas, CA (US); Chen-Jung Chien, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 184 days.

(21) Appl. No.: 13/135,357

(22) Filed: Jul. 1, 2011

(65) Prior Publication Data

US 2011/0262775 A1    Oct. 27, 2011

Related U.S. Application Data

(62) Division of application No. 11/728,910, filed on Mar. 27, 2007, now Pat. No. 7,979,978.

(51) Int. Cl.
*G11B 5/127* (2006.01)
(52) U.S. Cl.
USPC ...................................... 360/125.3
(58) Field of Classification Search
USPC ............... 360/125.3, 125.02, 125.13, 125.21, 360/125.24, 125.27, 125.04, 125.09, 125.12, 360/125.17, 125.06, 125.16, 125.15, 125.71; 29/603.14, 603.06, 603.09, 603.08, 603.15, 29/603.16
See application file for complete search history.

(56) References Cited

U.S. PATENT DOCUMENTS

| | | | |
|---|---|---|---|
| 7,002,775 B2 | 2/2006 | Hsu et al. | |
| 7,031,121 B2 | 4/2006 | Khera et al. | |
| 7,068,453 B2 | 6/2006 | Terris et al. | |
| 7,070,698 B2 | 7/2006 | Le | |
| 7,307,815 B2 | 12/2007 | Han et al. | |
| 7,322,095 B2 | 1/2008 | Guan et al. | |
| 7,441,325 B2 | 10/2008 | Gao et al. | |
| 7,477,481 B2 | 1/2009 | Guthrie et al. | |
| 7,587,810 B2 | 9/2009 | Le | |
| 7,649,712 B2 * | 1/2010 | Le et al. | 360/125.3 |
| 7,885,036 B2 * | 2/2011 | Matono et al. | 360/125.12 |
| 2006/0044682 A1 * | 3/2006 | Le et al. | 360/126 |
| 2008/0088972 A1 * | 4/2008 | Sasaki et al. | 360/110 |
| 2008/0112081 A1 * | 5/2008 | Matono | 360/125.08 |
| 2009/0168241 A1 * | 7/2009 | Mochizuki et al. | 360/125.03 |

\* cited by examiner

*Primary Examiner* — Allen T Cao
(74) *Attorney, Agent, or Firm* — Saile Ackerman LLC; Stephen B. Ackerman (57) ABSTRACT

A magnetic pole suitable for perpendicular magnetic recording is described. This write pole is symmetrically located relative to its side shields and has at least three additional surfaces that are disposed to lie in planes that are normal to the substrate's top surface.

8 Claims, 9 Drawing Sheets

SELF-ALIGNED FULL SIDE SHIELD PMR AND METHOD TO MAKE IT

This is a divisional application of U.S. patent application Ser. No. 11/728,910 filed on Mar. 27, 2007 now U.S. Pat. No. 7,979,978, which is herein incorporated by reference in its entirety, and assigned to a common assignee.

FIELD OF THE INVENTION

The invention relates to the general field of writing data into magnetic memory devices with particular reference to perpendicular write poles and their spatial relationship to their surrounding shields.

BACKGROUND OF THE INVENTION

Figure 1:
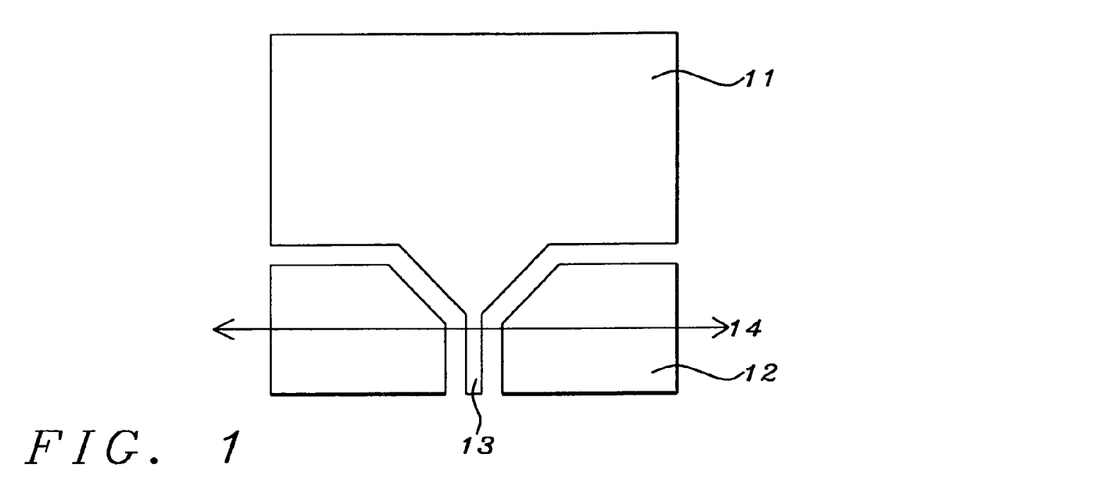
FIG. 1 illustrates the end product of the process of the present invention, including perpendicular write pole 13 that is guaranteed to be symmetrically disposed between side shields 12.

In order to be able to achieve the highest possible track density when using PMR (perpendicular magnetic recording), it is necessary to include side shields that reduce fringe effects and minimize side erasure. FIG. 1 is a plan view of the structure in question. Seen there are main body (yoke) 11 in which the write field will be induced by the activation of the field coils (not shown), side shields 12, and perpendicular write pole 13. Line 14 shows where the ABS (air bearing surface) will eventually be located, following the removal (by grinding and polishing) of the material below it.

It is important that the write pole be symmetrically located within the space between the side shields. If it is too close to one side or the other, one or more of the following problems may arise:

1) a reduction in overall process yield due to occasional shorting between the shield and the write pole
2) fringe effects at the pole edge farthest from shield
3) uneven side erasure.

A number of proposals have been put forward that use subtractive methods (such as RIE, IBE etc.) to etch an opening in a magnetic shield layer followed by standard ALD (atomic layer deposition), electroplating, and CMP methods to form the write pole inside said opening. However, in none of these approaches is the positioning of the write pole structure, between the side and trailing shields, accomplished through self-alignment, making the possibility of the occurrence of one or more of the problems listed above that much more likely.

These problems have been overcome through the development of the self-aligning method that we disclose below.

A routine search of the prior art was performed with the following references of interest being found:

U.S. Patent Applications 2006/0174474 (Le) and 2006/0044682 (Le et al) teach forming self-aligned wrap-around side and trailing edge shields. In U.S. Patent Application 2006/0002019, Guthrie et al. show Rh as a CMP stop layer in forming a self-aligned trailing shield. U.S. Patent Application 2005/0259355 (Gao et al) teaches self-aligned formation of trailing shields using Rh as a stop layer.

In U.S. Pat. No. 7,002,775, Hsu et al. disclose side shields and trailing shields, preferably made of the same material. The method of formation is not disclosed. U.S. Pat. No. 7,070,698 (Le) shows side shields and a trailing shield formed in separate steps.

U.S. Pat. No. 7,068,453 (Terris et al.) describes side shields and trailing shield around the write pole while, in U.S. Pat. No. 7,031,121, Khera et al. show read element shields and a trailing shield. U.S. Patent Application 2005/0237665 (Guan et al.) shows a leading shield, trailing shield, and two side shields to overcome side fringing. No fabrication details are given.

SUMMARY OF THE INVENTION

It has been an object of at least one embodiment of the present invention to provide a perpendicular magnetic recording device that includes a write pole that is always symmetrically positioned with respect to its surrounding magnetic side shield.

Another object of at least one embodiment of the present invention has been to provide a process for forming said device.

Still another object of at least one embodiment of the present invention has been that said process not require an optical alignment step for achieving said symmetrical positioning attribute of the structure.

A further object of at least one embodiment of the present invention has been to eliminate said optical alignment step by enabling the write pole to be self-aligned relative to the side shield.

These objects have been achieved by employing a trench (etched into a dielectric layer) as a mold for the formation of the write pole, after first lining the trench with a layer of ruthenium (or other suitable non-magnetic material) whose thickness is uniform and carefully controlled. Once the write pole has been formed, the dielectric layer is removed from its immediate vicinity and the top surface of the write pole is also coated with a layer of non-magnetic material whose thickness is precisely controlled, following which a second layer of soft magnetic material is deposited over the write pole.

The location of the write pole relative to the shield is thus determined through control of the thicknesses of the two layers of non-magnetic material, no optical alignment step being involved.

DESCRIPTION OF THE PREFERRED EMBODIMENTS

Figure 2:
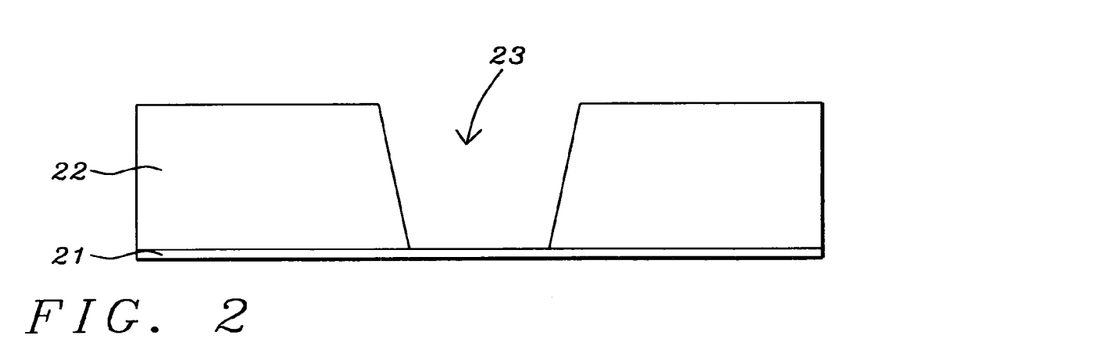
FIG. 2 shows the starting point for the process of the invention—a trench etched into a layer of insulation on a substrate.

Referring now to FIG. 2, and viewing the structure shown in FIG. 1 as it would appear at the future ABS, the process of the present invention begins with the deposition, onto substrate 21, of insulating layer 22 (typically alumina or silica) into which is etched trench 23, using RIE, IBE, or similar process.

Figure 3:
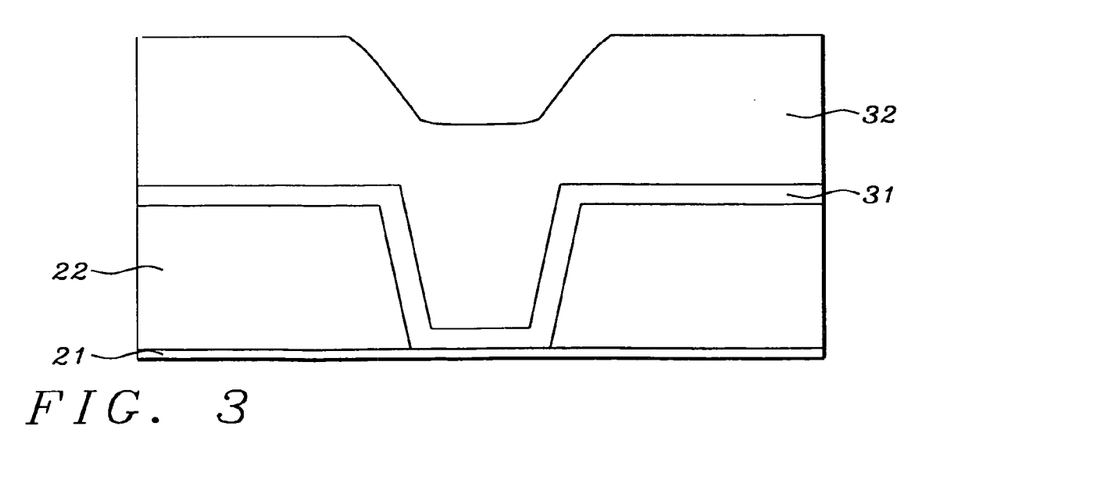
FIGS. 3-4 illustrate how the trench is just filled with material for the pole after the trench has been lined with a layer of non-magnetic material.

Next, as shown in FIG. 3, layer 31 of ruthenium is deposited (to a precision level of ±5%) to fully cover the inside of trench 23 as well as the top surface of layer 22. The preferred method for depositing layer 31 is ALD but other methods such as CVD and PVD could also have been used. Continuing our reference to FIG. 3, layer 32, of soft magnetic material suitable for use as a magnetic pole for writing data (e.g. FeNi or CoFeNi), is then deposited onto layer 31, to a thickness of between about 0.5 and 1 microns. This is accomplished by first depositing a conductive seed layer and then electroplating thereon the required thickness of soft magnetic material.

Figure 4:
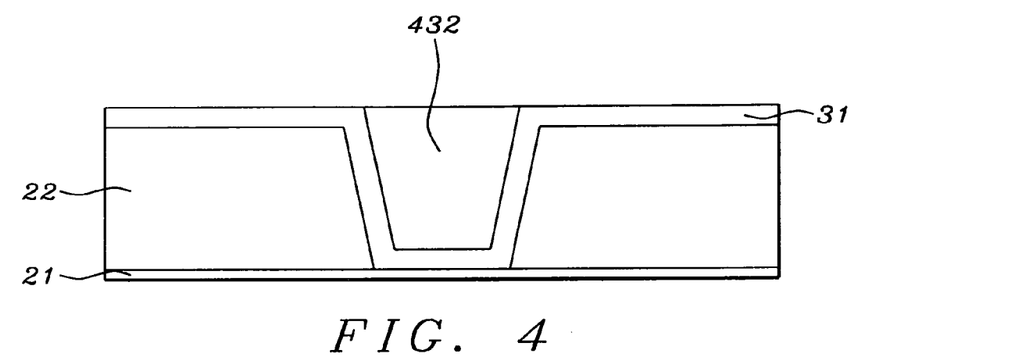

Moving on to FIG. 4, illustrated there is the end result of using CMP to remove all of layer 32 except portion 432 that just fills trench 23 (which at this point also includes layer 31 acting as a trench wall liner). During this step, ruthenium layer 31 acts as an etch stop layer so that very little of layer 31 has been removed at the point where CMP is terminated.

Figure 5:
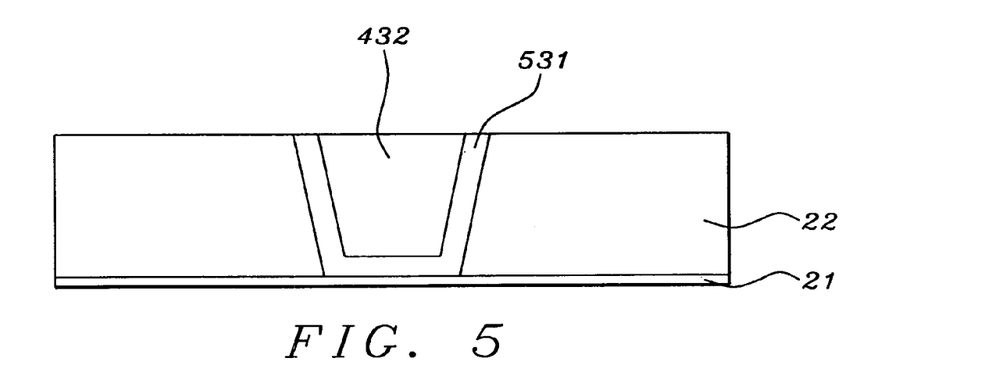
FIGS. 5-7 are, respectively, an ABS view, a side view, and a plan view of the structure of the invention after the non-magnetic Ru has been removed by ion beam etch in the vicinity of the write pole and the step main pole is formed.
Figure 6:
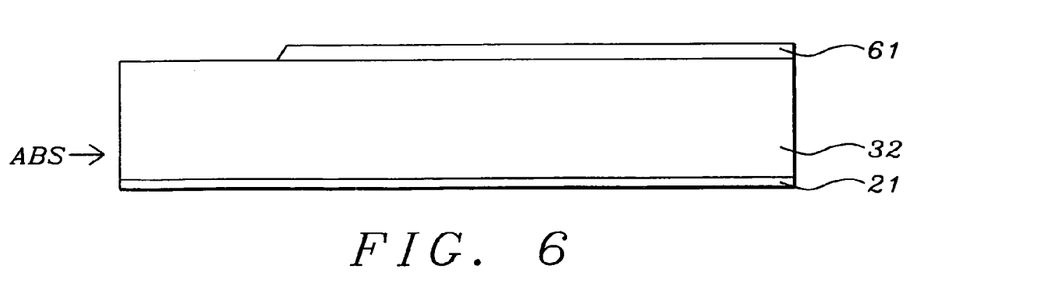
Figure 7:
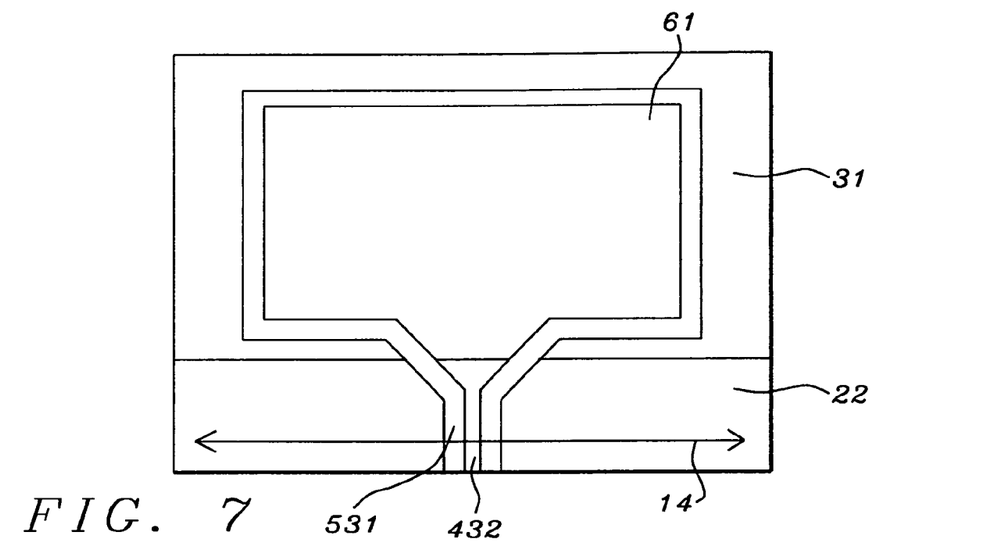

Referring next to FIG. 5, all of layer 31, other than trench liner layer 531, is removed. This is accomplished in two steps, the first being removing at least 10%, by thickness, through CMP, followed by ion beam etching for about 2 minutes, at a temperature of about 25° C., to remove the equivalent of about 700 Angstroms of NiFe. Turning next to FIGS. 6 and 7, main pole layer 61 has been patterned over all surfaces to a thickness between about 500 and 900 Angstroms and then patterned and etched using ion beam etching.

Figure 8:
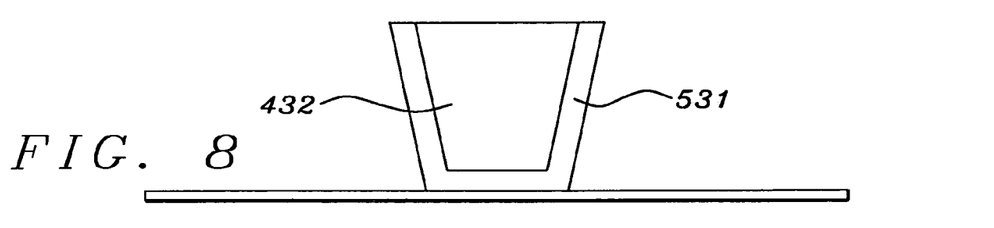
FIGS. 8-9 are an ABS view and a plan view of the invention after the non-magnetic Ru was removed by ion beam etch and alumina was removed by wet etch. The trench was formed in the vicinity of the write pole, thereby exposing the substrate.

FIG. 8 shows an ABS view of the structure following the removal of alumina layer 22. This is accomplished in two steps, first by RIE (reactive ion etching) using a $Cl_2/BCl_3$ chemistry for about 2 minutes followed by etching in an alkaline solution such as NaOH or KOH with EDTA (ethylenediamine tetra-acetic acid) being preferred, having a pH greater than about 10.5 at a temperature of about 80° C. for about 9 seconds.

Figure 9:
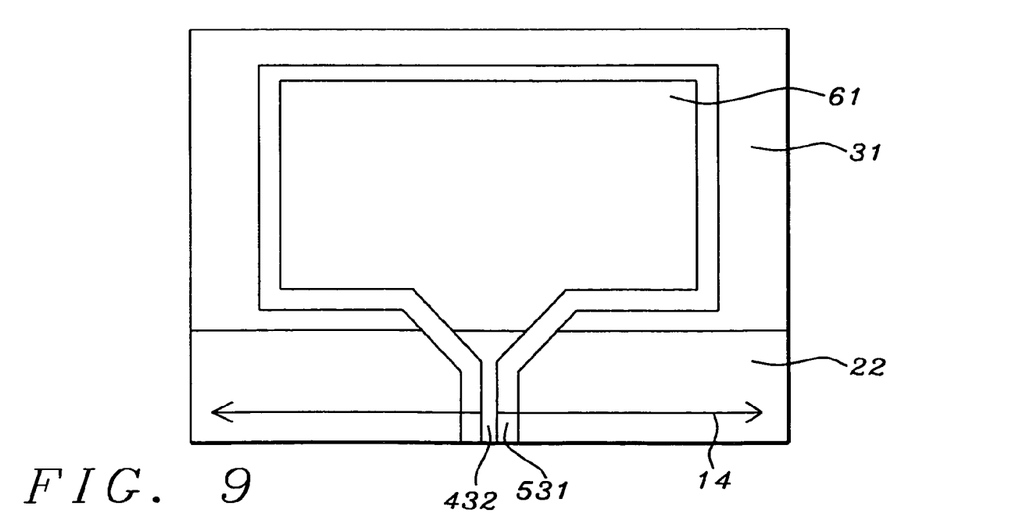

FIG. 9 is a plan view of the structure which shows substrate 21 extending out beyond area 11 for the purpose of providing mechanical support for the write pole.

Figure 10:
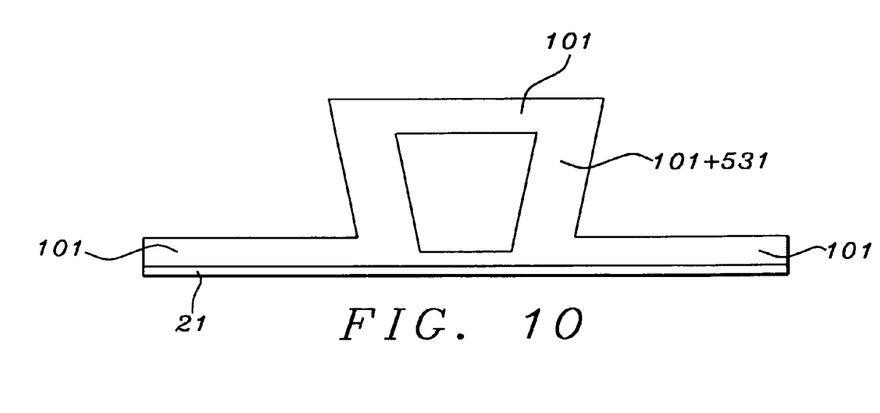
FIGS. 10-11 are, respectively, an ABS view and a side view after deposition of a second layer of non-magnetic writer gap material, such as Ru.
Figure 11:
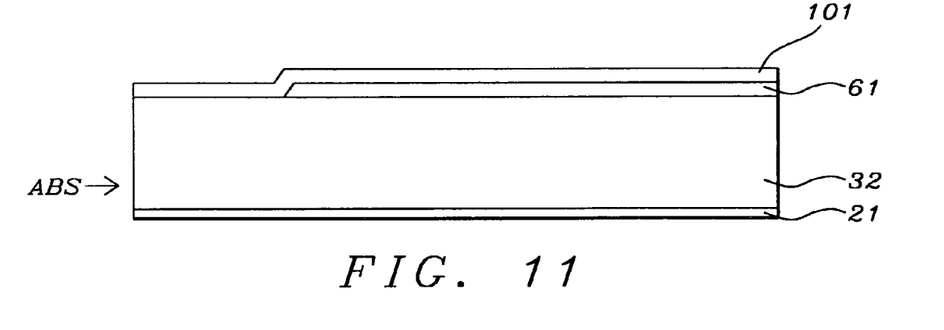
Figure 12:
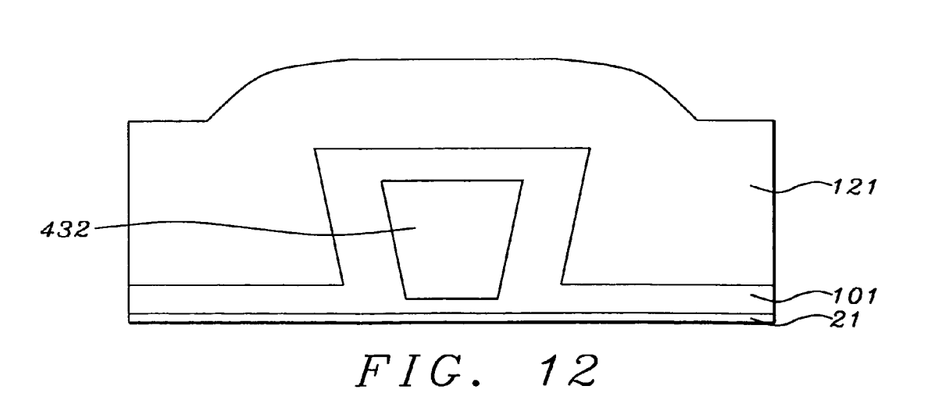
FIG. 12 is an ABS view following the deposition of a second soft magnetic layer.

Referring now to FIGS. 10 and 11, second ruthenium layer 101 is deposited over the full structure to a thickness between about 300 and 600 Angstroms and a precision level of ±5%. This serves primarily to cover the top surface of the write pole with non-magnetic write gap material, as seen in the ABS view of FIG. 10, but, as seen in FIG. 11, it also provides a conductive seed layer on which to grow the next layer through electrodeposition. This can be seen in FIG. 12 (also an ABS view) where soft ferromagnetic layer 121 has been electrodeposited onto layer 101.

Figure 13:
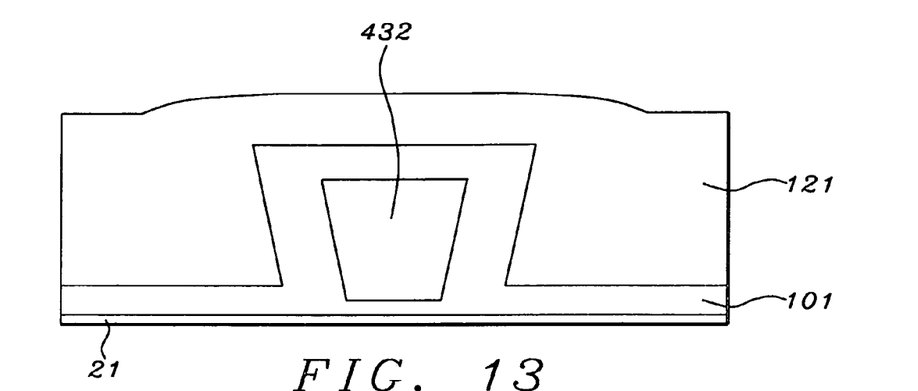
FIGS. 13-14 are, respectively, an ABS view and a side view after CMP has been used to planarize the second soft magnetic layer until its top surface is coplanar with the top surface portion of the non-magnetic write gap that is exposed first.
Figure 14:
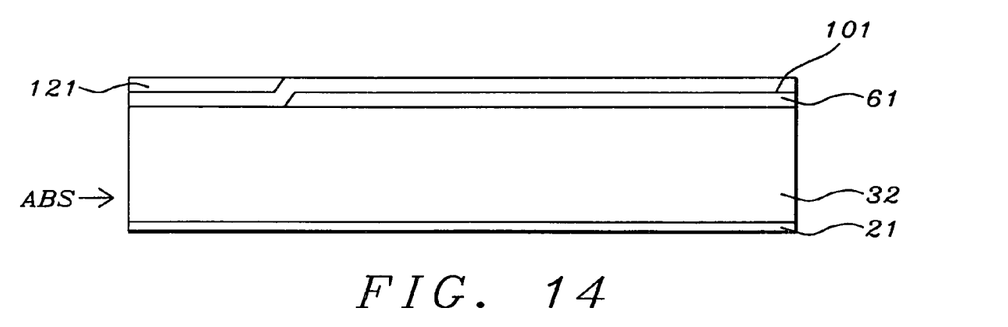

We refer next to FIGS. 13 and 14. These show the structure after layer 121 has been subjected to CMP until the portion of layer 101 that had been in contact with layer 121 is just exposed, leaving the slightly lower section of layer 101, that is closest to the ABS, still covered with what was left of layer 121 at the conclusion of CMP. This is best seen in FIG. 14 while FIG. 13 presents the ABS view.

Figure 15A:
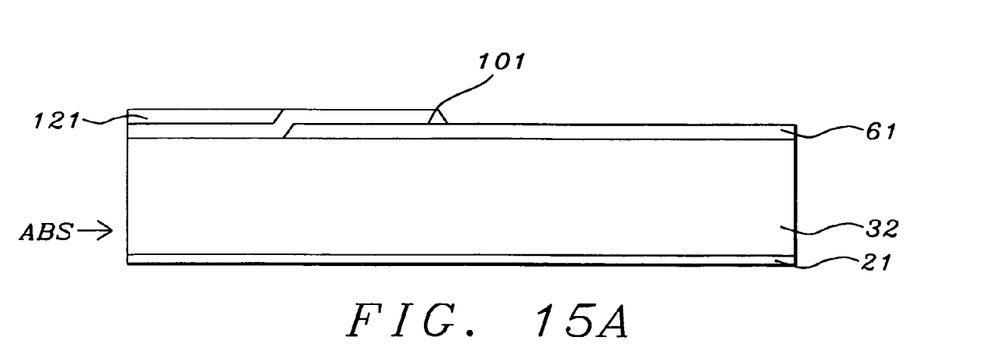
FIGS. 15a-15e illustrate the sequence of steps used for the completion of the process.
Figure 15B:
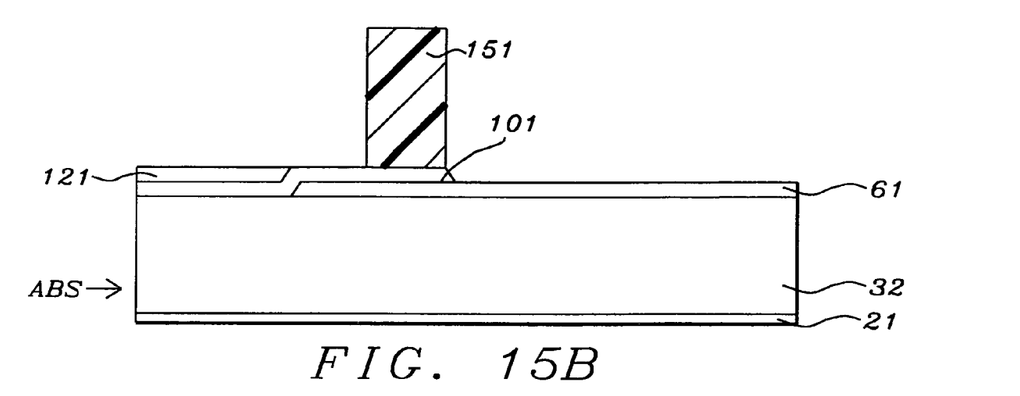
Figure 15C:
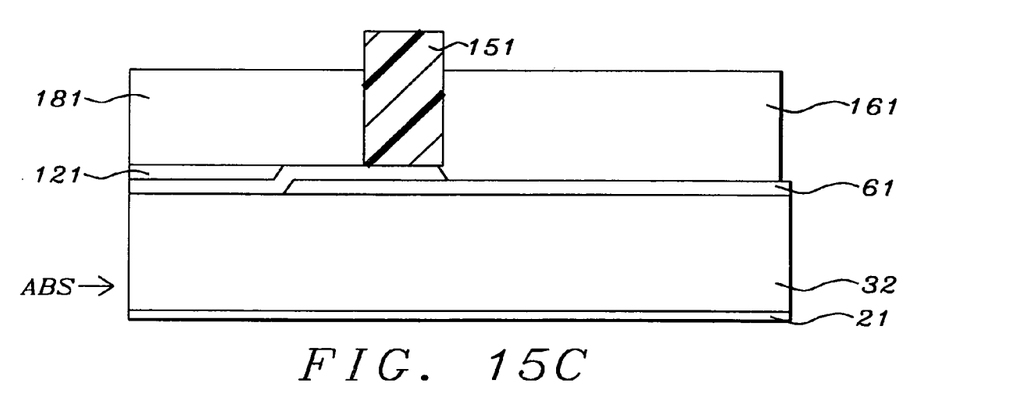

Most of layer 101 (the portion that extends away from the ABS and overcoats main body 11) is now selectively removed using ion beam etching, as illustrated in FIG. 15a. Photoresist frame 151 is then formed on the tail end of layer 101, as seen in FIG. 15b, followed by simultaneous electro-deposition of layers 181 (trailing shield) and 161 (top yoke), as seen in FIG. 15c.

Figure 15D:
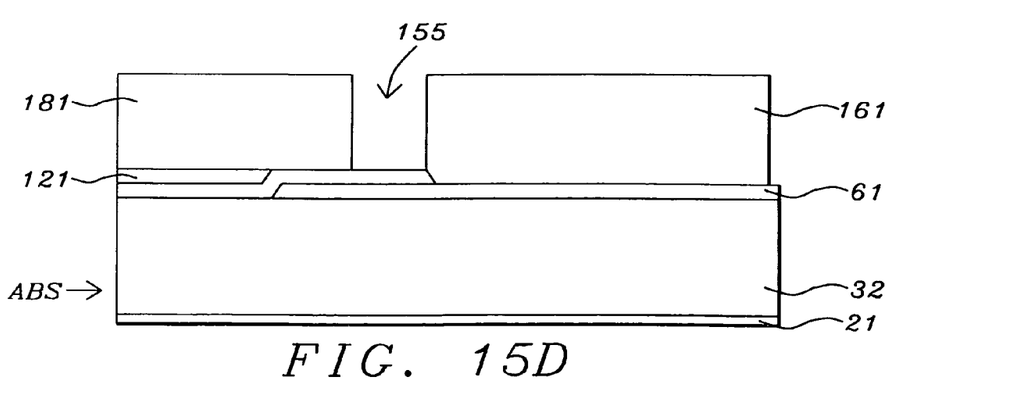
Figure 15E:
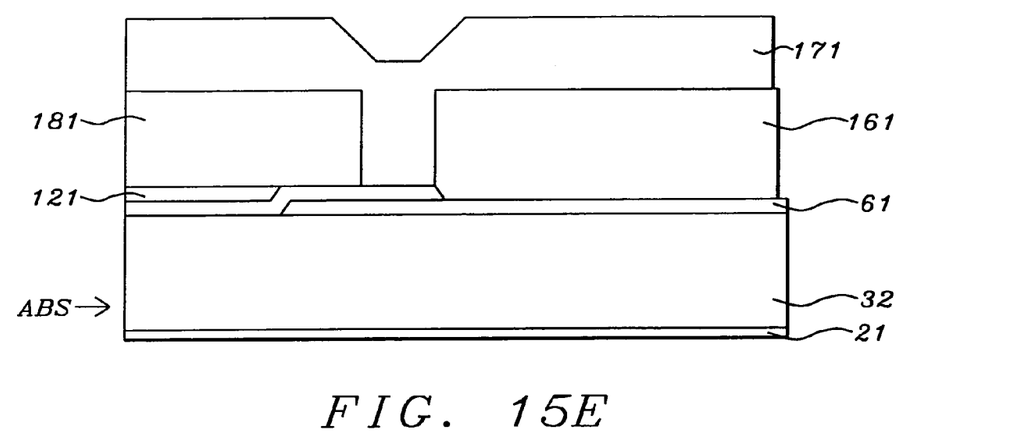

Referring now to FIG. 15d, photoresist frame 151 is stripped away, leaving behind empty trench 155. This is followed by the deposition of alumina (or silica) refill layer 171 (FIG. 15e), to a thickness between about 3,000 and 4,000 Angstroms, which is planarized using CMP, so that trench 155 is just filled.

The next step is the formation of trailing shield 161 by deposition of a suitable seed layer which is then patterned so that a layer of soft magnetic material may be grown thereon. This is followed by a final CMP step that concludes the process.

Figure 16:
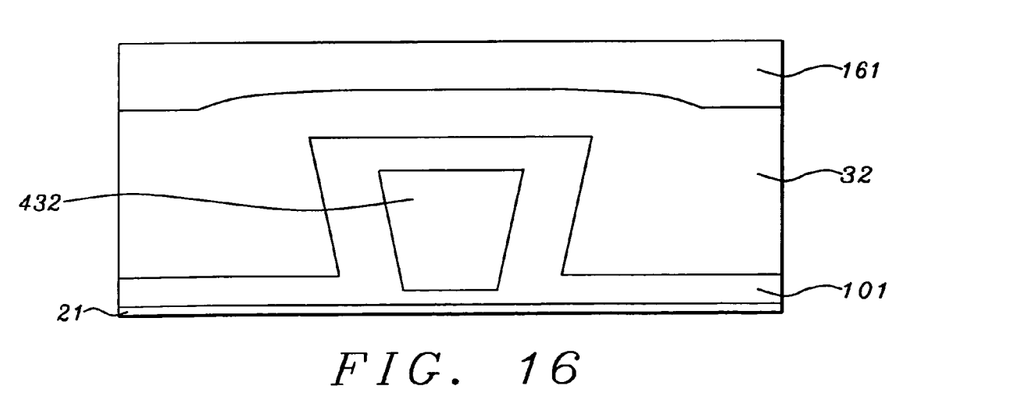
FIG. 16-18 are, respectively, an ABS view, a side view, and a plan view after deposition of a second layer of soft magnetic material that will serve as a trailing shield for the structure.
Figure 17:
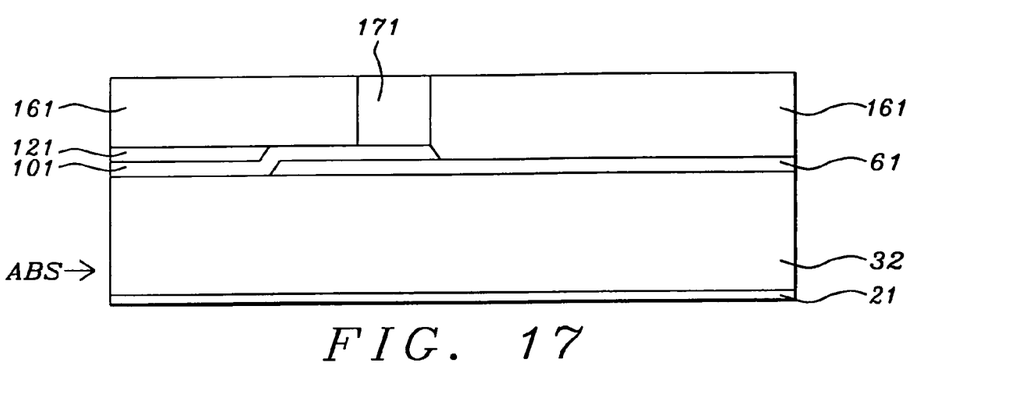
Figure 18:
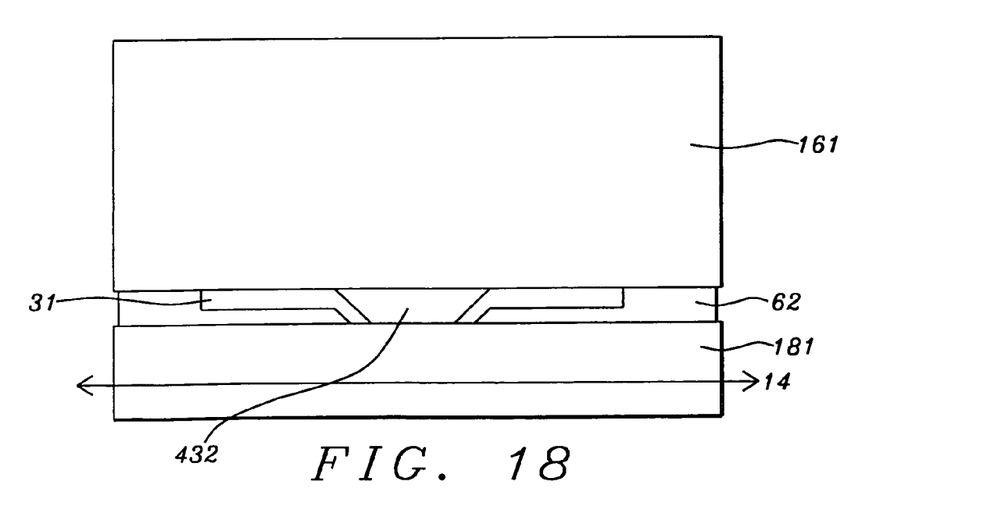
Figure 19:
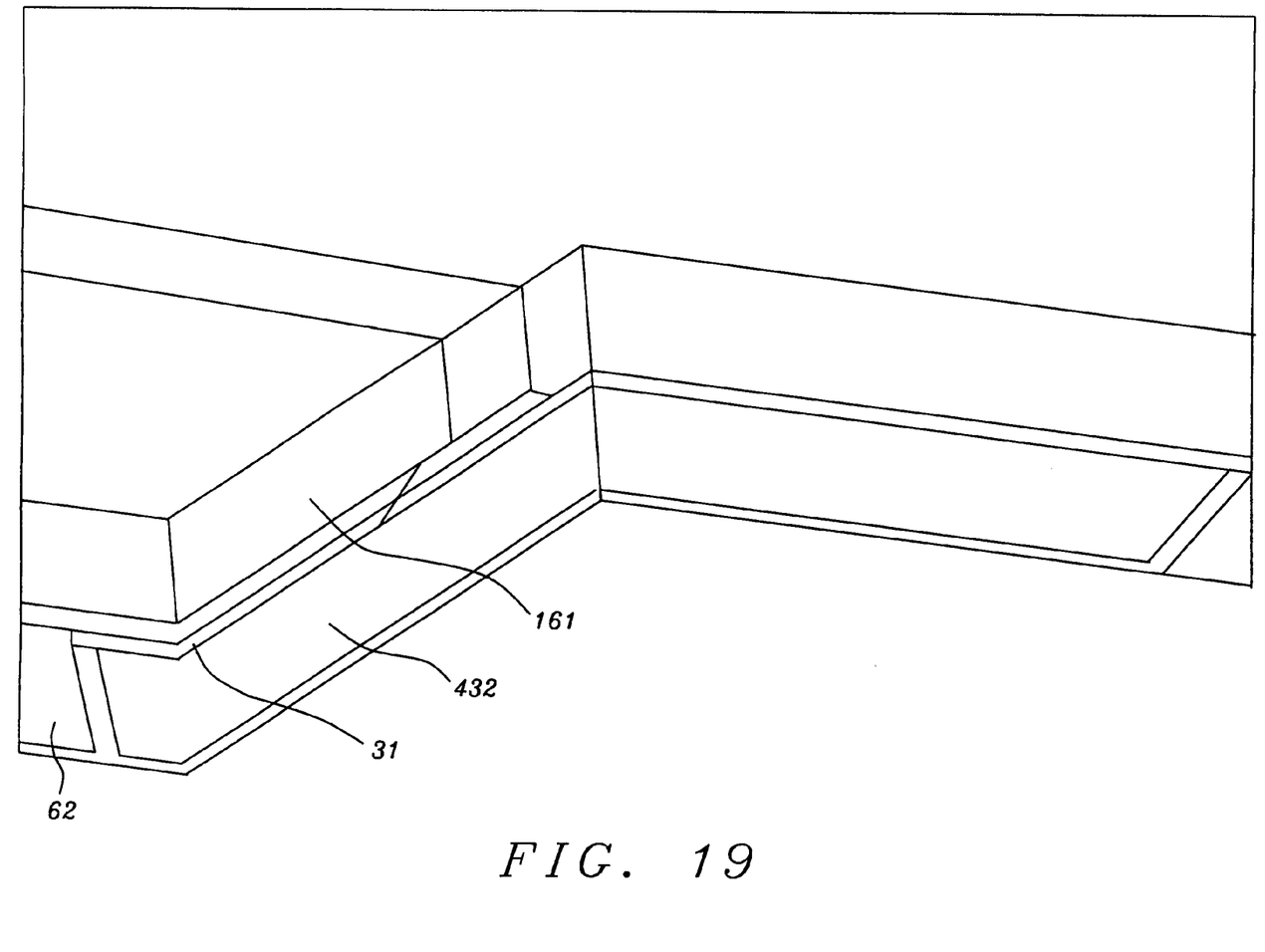
FIG. 19 is a 3-D (isometric) view of the completed invention, including a cut away corner to further clarify the relationship between the various layers.

FIG. 16 is an ABS view of the finished structure with FIG. 17 being a side view and FIG. 18 a plan view. A 3-D (isometric) view is presented in FIG. 19.

In conclusion, the main advantage of the process is a better track profile for a full side shielded PMR. Therefore, extendibility to high TPI (tracks per inch) applications for PMR can be more readily achieved with this new process and structure in comparison with conventional top shielded PMR heads

What is claimed is:

1. A magnetic pole suitable for perpendicular magnetic recording, comprising:
    a substrate having a top surface;
    said magnetic pole having a first surface that is normal to said substrate top surface, said first surface also being collinear with an edge of said substrate;
    said magnetic pole having at least three additional surfaces that are disposed to lie in planes that are normal to said first surface;
    each of said additional surfaces being coated with a layer of non-magnetic material, one of said layers of non-magnetic material serving as a bonding layer between said magnetic pole and said substrate top surface;
    each of said layers of non-magnetic material having a precise and predetermined thickness;
    on said substrate, a layer of soft magnetic material that fully contacts all of said layers of non-magnetic material, thereby serving as a magnetic side shield for said write pole; and
    in consequence of said non-magnetic layers having precise and predetermined thicknesses, said perpendicular magnetic recording head is symmetrically located relative to said magnetic side shield whereby said perpendicular magnetic recording head has minimal fringe effects and minimal side erasure.

2. The magnetic pole described in claim 1 wherein opposing layers of said non-magnetic material have the same thickness.

3. The magnetic pole described in claim 1 wherein each non-magnetic layer thickness is within of ±5% of said predetermined value.

4. The magnetic pole described in claim 1 wherein said non-magnetic layers have a thickness in the range of from about 400 to 800 Angstroms.

5. The magnetic pole described in claim 1 wherein said non-magnetic material is selected from the group consisting of ruthenium and rhodium.

6. The magnetic pole described in claim 1 wherein said layer of soft magnetic material is selected from the group consisting of FeNi and CoFeNi.

7. The magnetic pole described in claim 1 wherein said fringe effect is defined as magnetic write width less physical pole width.

8. The magnetic pole described in claim 1 wherein said side erasure is defined as fringe effect without said shield less fringe effect with said shield.

* * * * *